US010316816B2

(12) United States Patent
Chauvin et al.

(10) Patent No.: US 10,316,816 B2
(45) Date of Patent: Jun. 11, 2019

(54) HYDRAULIC WATER WHEEL FOR A DIRECTIONAL WATER FLOW

(71) Applicant: HeliosAltas Corp., Roseville, CA (US)

(72) Inventors: Phillip Chauvin, Lincoln, CA (US); Michael Thomas Carroll, Roseville, CA (US); Giovanni Pedrazzini, San Donato (IT)

(73) Assignee: HeliosAltas Corp., Roseville, CA (US)

(*) Notice: Subject to any disclaimer, the term of this patent is extended or adjusted under 35 U.S.C. 154(b) by 0 days.

(21) Appl. No.: 15/647,793

(22) Filed: Jul. 12, 2017

(65) Prior Publication Data

US 2018/0017035 A1    Jan. 18, 2018

Related U.S. Application Data

(60) Provisional application No. 62/361,738, filed on Jul. 13, 2016.

(51) Int. Cl.
| | |
|---|---|
| *F03B 13/08* | (2006.01) |
| *F03B 13/10* | (2006.01) |
| *F03B 17/06* | (2006.01) |
| *F03B 7/00* | (2006.01) |

(52) U.S. Cl.
CPC ............... *F03B 7/00* (2013.01); *F03B 13/08* (2013.01); *F03B 13/10* (2013.01); *F03B 17/063* (2013.01); *F03B 17/065* (2013.01); *F05B 2220/706* (2013.01); *F05B 2250/02* (2013.01); *Y02E 10/223* (2013.01); *Y02E 10/28* (2013.01)

(58) Field of Classification Search
CPC .. F03B 7/00; F03B 13/08; F03B 13/10; F03B 17/065
See application file for complete search history.

(56) References Cited

U.S. PATENT DOCUMENTS

| | | | | |
|---|---|---|---|---|
| 4,270,056 | A * | 5/1981 | Wright | F03B 17/063 290/54 |
| 4,717,831 | A | 1/1988 | Kikuchi | |
| 5,440,175 | A | 8/1995 | Mayo, Jr. et al. | |
| 6,208,037 | B1 | 3/2001 | Mayo, Jr. et al. | |
| 8,525,363 | B2 * | 9/2013 | Rajadhyaksha | F03B 17/062 290/53 |
| 8,536,725 | B2 * | 9/2013 | Lakhani | F03B 17/063 290/54 |
| 8,690,477 | B2 * | 4/2014 | Dempster | F03B 17/063 290/54 |

(Continued)

FOREIGN PATENT DOCUMENTS

WO    2014/113826 A1    7/2014

OTHER PUBLICATIONS

International Searching Authority, "Invitation to Pay Additional Fees and, Where Applicable, Protest Fee", for PCT/US2017/041906, dated Sep. 13, 2017, 2 pages.

(Continued)

*Primary Examiner* — Benjamin F Fiorello
(74) *Attorney, Agent, or Firm* — Zarley Law Firm, P.L.C.

(57) ABSTRACT

A hydraulic water wheel assembly and system where optimum results are obtained based upon factors such as the height of the channel, the distance between water wheels, the diameter of the discs, and the number, size, dimensions, and arrangement of the wing blades.

5 Claims, 4 Drawing Sheets

(56) References Cited

U.S. PATENT DOCUMENTS

| | | | |
|---|---|---|---|
| 8,786,122 B2* | 7/2014 | Rajadhyaksha | F03B 17/063 290/53 |
| 9,581,127 B2* | 2/2017 | Van Rompay | F03B 11/02 |
| 2005/0017513 A1* | 1/2005 | Sipp | F03B 17/063 290/54 |
| 2009/0108712 A1 | 4/2009 | Holtzapple et al. | |
| 2011/0042957 A1 | 2/2011 | Drews | |
| 2011/0057442 A1* | 3/2011 | Chauvin | F03B 17/063 290/43 |
| 2012/0230021 A1* | 9/2012 | Lynch | F03B 17/06 362/183 |
| 2012/0262036 A1* | 10/2012 | Drews | F03B 7/00 310/75 R |
| 2016/0348638 A1 | 12/2016 | Chauvin et al. | |

OTHER PUBLICATIONS

International Searching Authority, "Notification of Transmittal of The International Search Report and The Written Opinion of the International Searching Authority", for PCT/US2017/041906, dated Nov. 21, 2017, 19 pages.

\* cited by examiner

HYDRAULIC WATER WHEEL FOR A DIRECTIONAL WATER FLOW

CROSS REFERENCE TO RELATED APPLICATION

This application claims the benefit to Provisional Application U.S. Ser. No. 62/361,738 filed on Jul. 13, 2016.

BACKGROUND OF THE INVENTION

This invention is directed to a hydraulic water wheel for a directional water flow that can be confined in an open flume channel and more particularly to a water wheel that in slowing the flow producing a new hydrodynamic equilibrium characterized by values of potential and kinetic energy. The wing blades of the wheel take energy from the water as it spins at the same time backing up the water creating some level of head pressure. As the water passes through the wheel it accelerates the wing blades moving through the back side of the unit creating a lift affect adding additional power and increasing efficiency. This has the effect of producing much higher torque levels on the generator from the same flow of water. This allows for power production from much slower moving water than the current state of the art.

To maximize the energy off take utilizes a generator with a larger number of stators and rotors allowing the unit to operate at lower RPM levels. With this configuration very high levels of torque can be absorbed by the generator further increasing the potential efficiency at low RPM speeds. This generator is sealed in a waterproof shell and produces high levels of heat that requires cooling considerations.

Water wheels are well known in the art. While water wheels have proved to be useful particularly as used on rivers, most have seen little if any technical advancement since the early to mid-part of the nineteenth century. Thus, most water wheels are only useful for sites having hydraulic heads and have become irrelevant for typical applications such as pulling a river barge as a winch on an open flume. This new type of waterwheel can be deployed in many more types of applications, and is significantly more efficient than the historic waterwheel. Power can be produced from water moving at slower speeds, and with little to no head, creating an ultra-low pressure turbine. As such a need exists in the art for a new water wheel assembly and system that addresses these deficiencies.

An objective of the present invention is to provide a water wheel assembly and system that optimizes performance of water wheels.

Another objective of the present invention is to provide a water wheel assembly and system having a new hydrodynamic equilibrium with a greater value of potential and kinetic energy.

These and other objectives will be apparent to one skilled in the art based upon the following written description, drawings, and claims.

SUMMARY OF THE INVENTION

A hydraulic water wheel assembly and system for directional water flow having a plurality of water wheels selectively positioned within a channel. The water wheels have a pair of discs separated in spaced parallel relation by a plurality of wing-blades.

Optimum performance is obtained by adjusting the size and structure of the discs diameter and the number, size, dimensions, and arrangement of the wing blades based on different operating parameters.

Also, optimum performance is obtained based upon environmental parameters such as the relationship of water levels and the distance between water wheels and the height of the channel in relation to the water level at the installation point.

DETAILED DESCRIPTION OF THE PREFERRED EMBODIMENT

Figure 1:
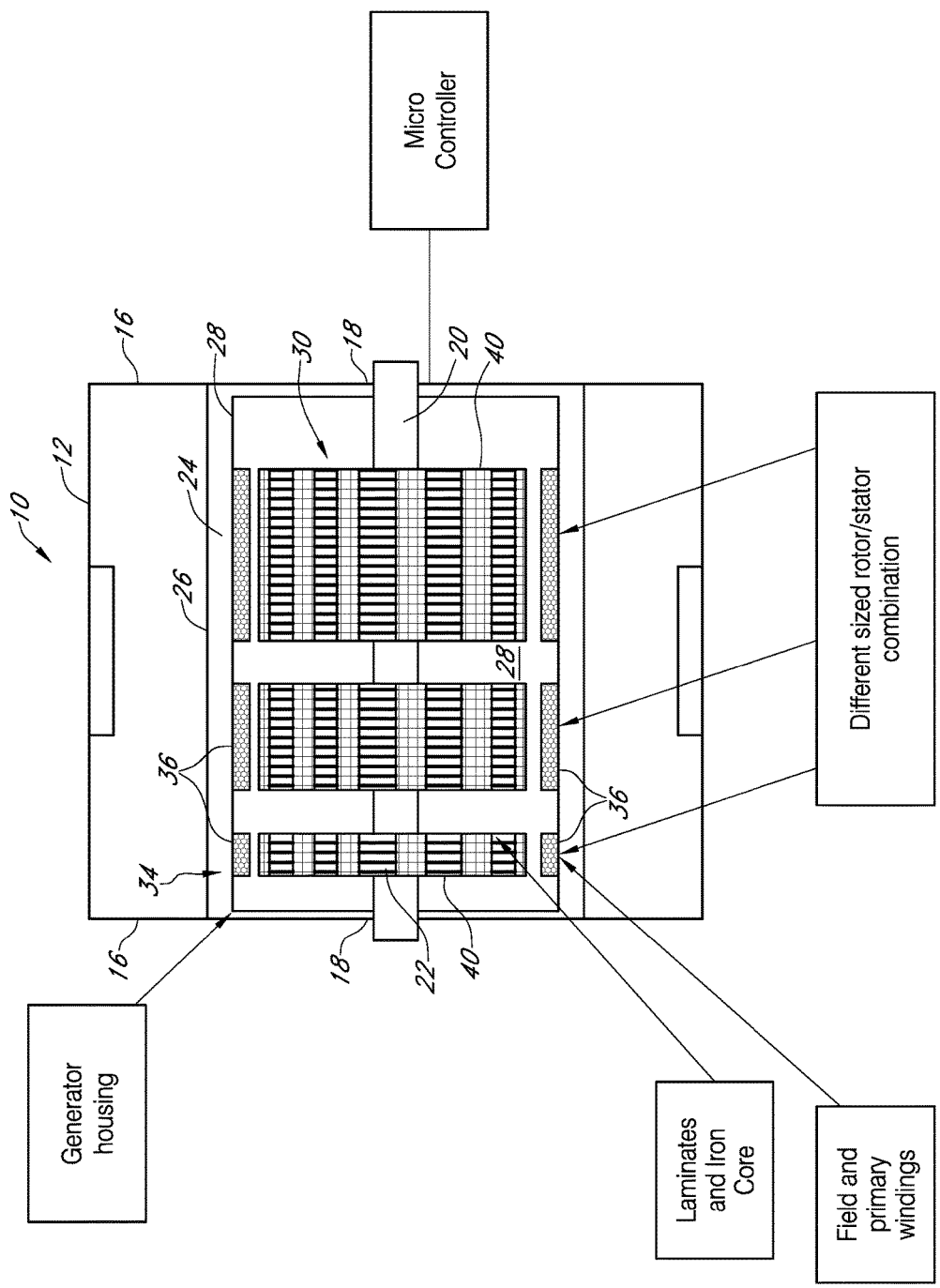
FIG. 1 is a side sectional view of a water wheel assembly.
Figure 2:
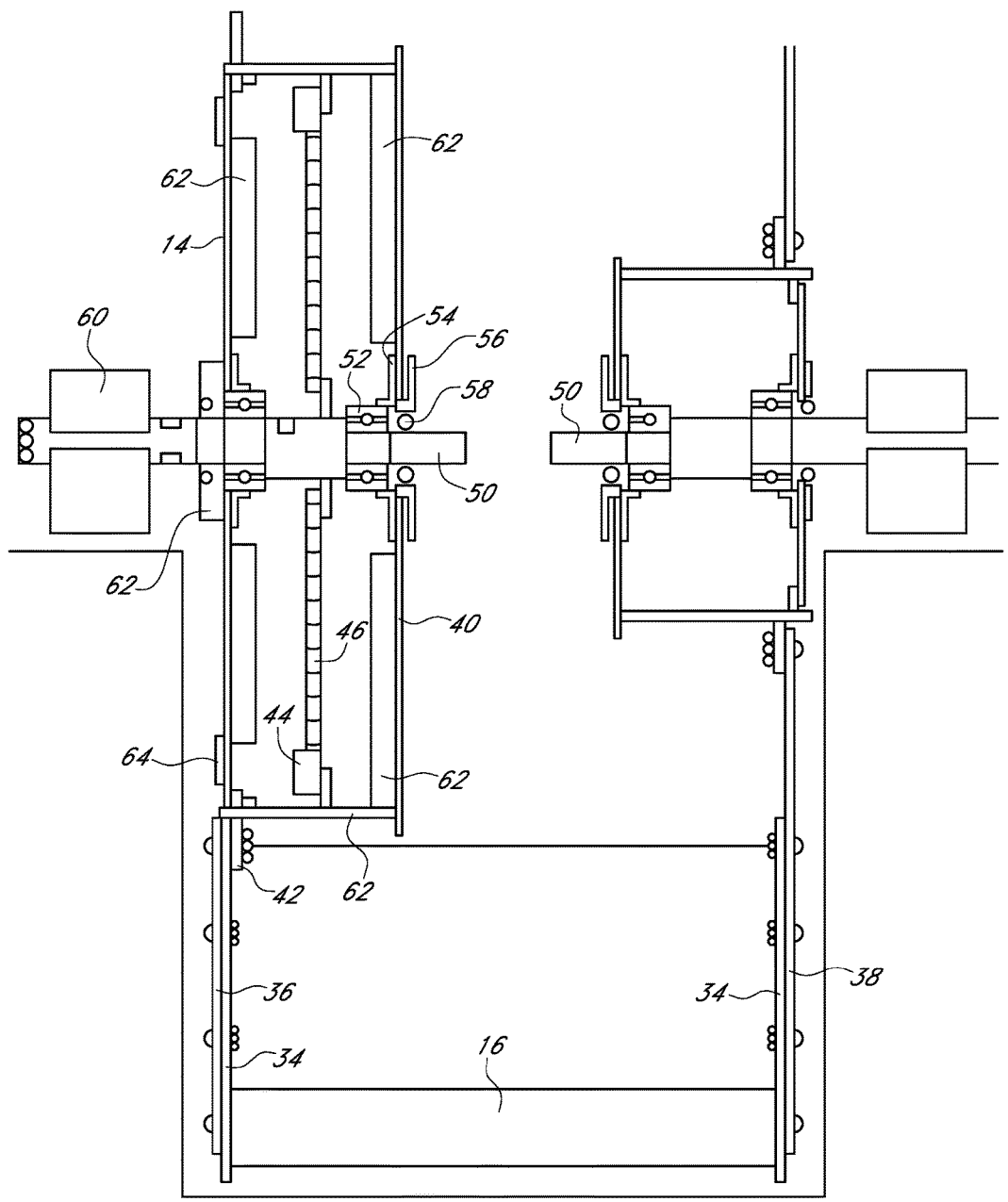
FIG. 2 is a side sectional view of a water wheel assembly.
Figure 3:
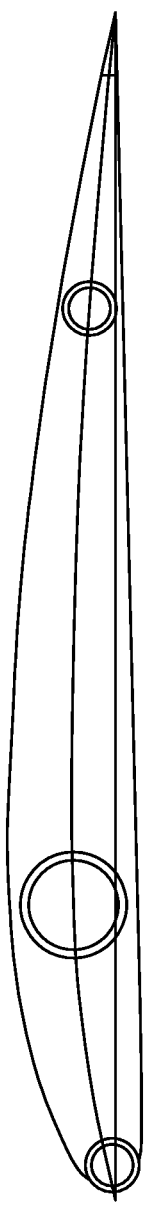
FIG. 3 is a side view of a wing blade.
Figure 4:
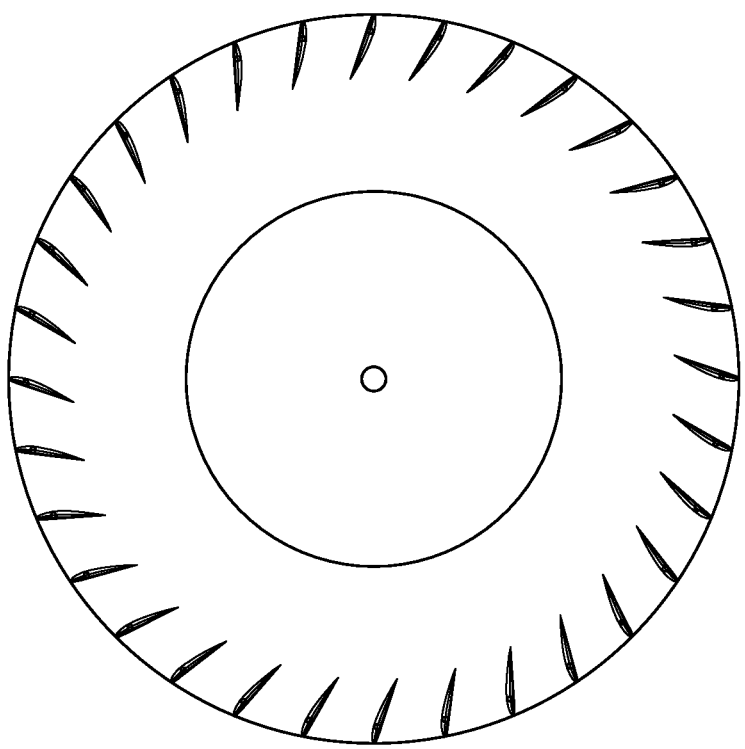
FIG. 4 is an end sectional view of a water wheel.

Referring to the Figures, a hydroelectric generator assembly 10 has a water wheel 12 that includes a pair of discs 14 that are separated in spaced parallel relation by a plurality of wing-blades 16. Extending through central openings 18 in the discs 14 and mounted to the discs 14 is a shaft 20. Mounted to the shaft 20 are a plurality of magnetic rotors 22. The rotors 22 are positioned within a housing 24 in relation to the stators 26 which are mounted to a stationary housing such that the rotors 22 induce and the stators collect current/electricity. Optimum performance of the water wheel 12 is dependent upon a number of parameters such as the height of the banks of a canal or confined water flow, speed of the water, the initial water level of the channel without the water wheel, the pitch between water wheels, the diameter of the water wheel, the number of wing-blades on the water wheel, the revolutions per minute (RPM) of the water wheel, the size and profile of the wing-blades 16, and the arrangement of the wing-blades 16 on the water wheel 12.

In another example the water wheel assembly 10 has a plurality of wing blades 16 that extend between wing panels 34. The wing panels 34 are connected to a first 36 and a second spoke 38.

The first spoke 36 is operatively connected to a housing 40 by a grounding jump 42. Disposed within the housing 40 is a magnetic joke rotor 44 associated with a stator 46 including a larger number of 44 and 46 of 15 or greater. The stator 46 is mounted about an axle 50 that extends through the housing 40. The axle 50 is rotatably connected to the housing 40 by a bearing 52, a bearing holder 54, a gasket holder 56, and a gasket 58. The axle 50 is connected to a grounding brush generator 60. The housing has a plurality of water proof covers 62. The higher number of stators and rotors produced energy at slower revolutions per minute down to 5 RPM. This unique installation allows for high torque to be produced at slow RPM.

To obtain optimum results, a variation of the upstream water level of the water wheel is dependent upon the required torque of the wheel where the greater the torque, the higher the level reached. More specifically, optimum results are obtained where the upstream level is 2.19 times the initial water level of the channel without installation of the water wheel 12. Similarly, the downstream level is dependent upon the torque to the wheel and optimum results are obtained where the escape water level is 0.92 time the initial water level of the channel without installation of the water wheel 12. For example, where the initial water level is 0.5 m, the optimum upstream level would be 1.095 m and the optimum downstream level would be 0.46 m. Lower water differences will product lower power levels, but still higher than typical known installations.

The change in levels between the upstream and the downstream assumes variations of the speed of the water flow that, by effect of the hydraulic continuity law the upstream velocity decreases, but not to zero, while the downstream velocity increases considerably. With the difference between the measures of the upstream and downstream level a virtual head value (H*) is determined that is generated from two contributions with the first being the variation in levels given by the presence of the water wheel and the second being the fact that the upstream water speed does not drop even though it has been reduced. For example, where the upstream water speed is 1.124 m/sec in a channel where the water flows at 2.4 m/sec without the installation of the water wheel, the virtual head is calculated using the following equation:

$$H^* = \Delta H + Vm2/2 \; g = (1.09 - 0.46) + (1.124^2)/2 \; g = 0.694 \text{ m} \quad (1)$$

The value of the virtual head H* is greater than the initial value without the water wheel in the channel as shown by the following equation:

$$H_o^* = (2.4^2)/2 \; g = 0.30 \text{ m} \quad (2)$$

Thus, the head coefficient due to the presence of the wheel is in this example is:

$$kH = H_o^*/H^* = 0.30/0.694 = 0.432 \quad (3)$$

As a result, the installation of the water wheel 12 into the watercourse produces a new hydrodynamic equilibrium having a greater value of potential and kinetic energy that cannot be found in the absence of the water wheel. From this information, it is possible to define the theoretical power provided with the insertion of the wheel using the following equation:

$$P = \gamma \cdot Q \cdot H^*/102 = 19.99 \text{ kW} \quad (4)$$

The kinetic energy value contained in the vein loses meaning when the water wheel is installed in the channel, but the value may become useful to calculate the power that the wheel can provide. This is the case when the relationship between the output brake power (obtained by multiplying the angular velocity ω for the torque) and the kinetic energy of the vein pattern before insertion of the wheel (kinetic energy given by the product of the flow rate for the density of the water for half the square of the speed), represented by the symbol F, are considered. From the example, above, optimum results have F=0.685 and efficiency η=0.305.

As for the Kinetic energy into the vein without the water wheel 12, the following equation is used:

$$Ek = \tfrac{1}{2} Q \cdot \gamma \cdot Vo2 = 8899.4 \text{ J} \quad (5)$$

The power calculated by the efficiency value is $$W = P \cdot \eta = 19.99 \cdot 0.305 = 6.095 \text{ kW}; \quad (6)$$

which, when compared to:

$$W = Ek \cdot F = 8899.4 \cdot 0.685 = 6.099 \text{ kW} \quad (7)$$

are practically the same.

Another factor affecting performance is the height of a channel 28 at an insertion point 30 of the water wheel 12. When the water wheel 12 is installed in the channel 28, the water wheel 12 produces a greater resistance to water flow as compared to the initial level of the channel without the water wheel 12. Preferred is that that the height of the shoulders 32 of the channel 28 be up to 263% of the initial water level of the channel 28 at the installation point 30. For example, where the initial water level of the channel is 500 mm prior to installation of the water wheel, the desired height of the shoulders 32 of the channel 28 at the insertion point is 1,315 mm (500 mm×2.63).

Also, affecting optimum performance is the minimum pitch between a first and a second water wheel installation. Preferably, the minimum pitch between water wheels depends upon the upstream and downstream water levels produced by the installation of the water wheel and the slope of the channel 28. For example, preferred is a water wheel that produces in the flume a resistance that raises the water level upstream of the water wheel 218% and decreases the downstream water level 92%. For example, where the initial water level in the channel 28 is 500 mm, the preferred minimum upstream level would be 1094 mm (500 mm×2.18) and the minimum downstream level would be 460 mm (500 mm×0.92). The difference between the levels is 634 mm. Where the slope is 6.3/1000 or 0.063, in this example, in order to achieve the same upstream level without disturbing another wheel on the course of the channel, the preferred distance between the wheels, or pitch, is approximately 100 m (634/6.3).

Optimum performance is also dependent upon the diameter of the discs 14 of the water wheel 12. In particular, to obtain optimum results the diameter of the disc 14 is determined based upon a scaled ratio of the initial channel level and diameter as it relates to the channel level at the installation point. For example, where the initial channel level is 500 mm, optimum results occur where the disc has a diameter of 156.1 mm. To determine the diameter where the channel level is 20 mm at the installation point, the initial channel level of 500 mm is divided by a scale ratio of 12.3 which produces 40.65 mm. The initial diameter of 156.1 mm is then multiplied by 40.65 and then divided by 20 mm which results in a diameter of 317 mm. To obtain the peripheral diameter the calculated diameter of 317 mm is multiplied by the scaled ratio of 12.3 which results in 3,899.1 mm. From this, a first ratio coefficient, useful for other applications, is determined by dividing the peripheral diameter by the initial channel level or 3,899.1/500=7.7982.

A further factor to be considered is the number of wing-blades positioned on the wheel. In the above example, optimum results were found where the initial channel level was 500 mm, the diameter was 156.1 mm, and 16 blades were positioned between the outer perimeters of the discs. From this, the pitch between the blades is determined by the following equation:

$$Pp = \pi \cdot D1M/Np = \pi \cdot 156/16 = 30.63 \text{ mm} \quad (8)$$

Where D1M is optimum diameter and Np is the optimum number of blades. To determine the optimal number of blades for a new model would depend upon the new wheels diameter and the optimum pitch or:

$$Np1 = \pi \cdot D/Pp = 32.5, \text{ then } Np1 = 32 \quad (9)$$

From this, a second coefficient $K_{np}$ representing the relationship between the initial level and the number of blades Np is calculated as shown below:

$$K_{np} = h_0/N_p = 500/32 = 15.625 \quad (10)$$

To determine the desired revolutions per minute (RPM) of the wheel you begin with the value for the virtual head of 0.694 m and calculate the absolute value of the velocity corresponding to the virtual head as follows:

$$V_{H^*} = (2 \cdot g \cdot H^*)^{0.5} = 3.69 \text{ m/sec} \quad (11)$$

Using a ratio between the peripheral velocity resulting in optimum efficiency of the wheel to the virtual absolute velocity as calculated below:

$$K_{pm}=V_{H^*m}/U_m=0.303 \quad (12)$$

One can determine the peripheral speed of the wheel. The peripheral speed is determined by multiplying the virtual head velocity by the ratio (3.69×0.303) which results in 1.11 m/sec. The revolutions per minute is then determined as follows:

$$U=\omega \cdot r; \text{ as } r=\tfrac{1}{2}D, \text{ or}$$

$$\omega=U/r=1.11/(3900/2000)=0.564 \text{ rad/sec and} \quad (13)$$

$$RPM=60 \cdot \omega/(2 \cdot \pi), \text{ or } RPM=5.38 \text{ r/min} \quad (14)$$

The size and dimensions of the blade-wings are also important to obtain optimum results. As an example, a ratio of 5.65 between the length of the blade and the cord around the blade is preferred. Also important is the clearance between the channel walls and the wheel. Preferably, the width of the blade is 0.921 of the total width of the channel. As an example, where the channel width is 200 mm, the width of the blade would be 184 mm and the clearance on each end 7.5 mm. Also, the thickness of the blade is preferred to be 5 mm or less. As for the profile of the blade, while a flat rectangular blade can be used, preferred is use of a blade having an airfoil profile such as a NACA 4415 series or a Gottingen GOE 436. The effect on lift of the blade is more pronounced with the airfoil profile.

As for the arrangement of the blades on the water wheel, based upon the lift effect, a small angle, as shown below, between the vector of the relative velocity of the water and the peripheral velocity of the wheel is desired. Preferably the optimum angle $\alpha$ is $\alpha=-20°$ This means that the profiled wing-blade with the back of the profile facing downward, is inclined by 20° with respect to the horizontal cord.

What is claimed is:

1. A hydroelectric generator assembly, comprising:
   a water wheel having a pair of discs that are separated in spaced parallel relation by a plurality of wing blades;
   a shaft extending through central openings in the pair of discs;
   a plurality of rotors mounted to the shaft within a housing; and
   a plurality of stators mounted to the housing in relation to the rotors;
   wherein the wing blades have an angle of −20° between a vector of a relative velocity of water and a peripheral velocity of the wheel.

2. The assembly of claim 1 wherein a diameter of the discs of the water wheel at an installation point is an initial channel level divided by a scale ration of 12.3.

3. The assembly of claim 1 wherein the pitch between the wing blades is an initial diameter of the discs divided by the number of blades times π.

4. The assembly of claim 1 wherein the wing blades have a ratio of 5.65 between a length of the blade and a cord around the blade.

5. The assembly of claim 1 wherein the generator is contained within a sealed waterproof shell that is cooled.

* * * * *